United States Patent
Anderson (10) Patent No.: US 10,607,612 B2
(45) Date of Patent: Mar. 31, 2020

(54) HIERARCHICAL INTIMACY FOR COGNITIVE ASSISTANTS

(71) Applicant: INTERNATIONAL BUSINESS MACHINES CORPORATION, Armonk, NY (US)

(72) Inventor: Ryan R. Anderson, Kensington, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/787,996

(22) Filed: Oct. 19, 2017

(65) Prior Publication Data

US 2019/0122668 A1    Apr. 25, 2019

(51) Int. Cl.
| | | |
|---|---|---|
| *G10L 17/06* | (2013.01) | |
| *G10L 17/00* | (2013.01) | |
| *G10L 17/18* | (2013.01) | |
| *G10L 13/027* | (2013.01) | |
| *G06F 17/28* | (2006.01) | |
| *G10L 15/18* | (2013.01) | |
| *G06F 16/9032* | (2019.01) | |

(Continued)

(52) U.S. Cl.
CPC .............. *G10L 17/06* (2013.01); *G06F 3/167* (2013.01); *G06F 16/9035* (2019.01); *G06F 16/90332* (2019.01); *G06F 17/279* (2013.01); *G06F 17/2881* (2013.01); *G06N 5/00* (2013.01); *G10L 13/027* (2013.01); *G10L 15/1822* (2013.01); *G10L 17/005* (2013.01); *G10L 17/18* (2013.01); *G10L 17/00* (2013.01)

(58) Field of Classification Search
CPC ..... G10L 17/06; G10L 13/027; G10L 17/005; G10L 17/18; G06F 17/2881; G06F 17/30976; G06F 17/30997; H04L 51/02; H04L 51/16; H04L 51/04; H04L 43/045; H04L 51/08
USPC ............ 704/275; 379/88.13; 706/11; 707/69, 707/E17.014

See application file for complete search history.

(56) References Cited

U.S. PATENT DOCUMENTS

| | | |
|---|---|---|
| 6,212,502 B1 | 4/2001 | Ball et al. |
| 6,363,346 B1 | 3/2002 | Walters |

(Continued)

OTHER PUBLICATIONS

Eric Horvitz et al., Intelligent Cognitive Assistants, Workshop Summary and Recommendations, Semiconductor Research Corporation, 2016, 42 pages.

(Continued)

*Primary Examiner* — Mouloucoulaye Inoussa
(74) *Attorney, Agent, or Firm* — Conley Rose, P.C.

(57) ABSTRACT

A computer-implemented method executed by a cognitive system for incorporating hierarchy knowledge. In one embodiment, the computer-implemented method includes the steps of identifying one or more participants during an interaction; obtaining profile information for each of the participants; determining a hierarchy score for each of the participants based on a plurality of factors using the profile information for each of the participants; monitoring and analyzing communications between the participants during the interaction to identify boundary conditions based on the hierarchy score; and interacting with one or more the participants in a manner consistent with the hierarchy score of the participants.

20 Claims, 3 Drawing Sheets

(51) Int. Cl.
*G06N 5/00* (2006.01)
*G06F 3/16* (2006.01)
*G06F 17/27* (2006.01)
*G06F 16/9035* (2019.01)

(56) References Cited

U.S. PATENT DOCUMENTS

| | | | |
|---|---|---|---|
| 7,058,208 B2 * | 6/2006 | Chang | G07C 9/00158 379/265.13 |
| 8,346,556 B2 | 1/2013 | Stewart et al. | |
| 9,547,471 B2 | 1/2017 | Williams et al. | |
| 2011/0054985 A1 | 3/2011 | Ricci et al. | |
| 2016/0193732 A1 | 7/2016 | Breazeal et al. | |
| 2016/0358092 A1 | 12/2016 | Stolarz et al. | |
| 2017/0171117 A1 * | 6/2017 | Carr | H04L 51/02 |
| 2018/0253659 A1 * | 9/2018 | Lee | H04L 51/02 |

OTHER PUBLICATIONS

Hofstede, "Power Distance," Wikipedia, https://en.wikipedia.org/wiki/Power Distance, 13 pages.
"Emotional Intelligence," https://en.wikipedia.org/wiki/Emotional_intelligence, 22 pages.
Merritt, "Culture in the Cockpit," Sage Journals, Journal of Cross-Cultural Psychology, vol. 31, Issue 3, May 1, 2000, pp. 283-301.
"Geert Hofstede," Wikipedia, https://en.wikipedia.org/wiki/Geert_Hofstede, downloaded from the Internet Oct. 13, 2017, 7 pages.
"Hofstede's Cultural Dimensions Theory," Wikipedia, https://en.wikipedia.org/wiki/Hofstede's_cultural_dimentions_theory, downloaded from the Internet Oct. 13, 2017, 12 pages.
"Impact of Culture on Aviation Safety," Wikipedia, https://en.wikipedia.org/wiki/Impact_of_culture_on_aviation_safety, downloaded from the Internet Oct. 13, 2017, 3 pages.

* cited by examiner

HIERARCHICAL INTIMACY FOR COGNITIVE ASSISTANTS

BACKGROUND

The present disclosure relates generally to cognitive digital assistant (CDA) systems. Today's CDAs such as Apple's Siri® and Amazon's Alexa® are programmed with artificial intelligence (AI), machine learning and voice recognition technology. As the end user interacts with the digital assistant, the AI programming uses sophisticated algorithms to learn from data input and become better at predicting the end user's needs. Tomorrow's digital assistants will be built with more advanced cognitive computing technologies which will allow a digital assistant to understand and perform more complex tasks.

SUMMARY

The disclosed embodiments seek to improve cognitive digital assistant systems by applying a level of emotional intelligence that they currently do not possess. For example, in one embodiment, a computer-implemented method for incorporating hierarchy knowledge in a cognitive digital assistant system is disclosed herein. The cognitive digital assistant system may be configured to use the hierarchy knowledge to assist a user in navigating a variety of social environments.

As an example embodiment, a computer-implemented method is disclosed that includes the step of identifying one or more participants during an interaction. The computer-implemented method obtains profile information for each of the participants. The computer-implemented method determines a hierarchy score for each of the participants based on a plurality of factors using the profile information for each of the participants. The computer-implemented method interacts with one or more the participants in a manner consistent with the hierarchy score of the one or more participants.

In certain embodiments, the computer-implemented method further monitors and analyzes communications between the participants during the interaction to identify boundary conditions based on the hierarchy score. The computer-implemented method may further inform a first participant that the first participant's interaction with a second participant is either approaching or exceeding a boundary condition. In one embodiment, the boundary condition is based on a difference between a hierarchy score of the first participant and a hierarchy score of the second participant.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

A module as referenced herein may comprise of software components such as, but not limited to, data access objects, service components, user interface components, application programming interface (API) components; hardware components such as electrical circuitry, processors, and memory; and/or a combination thereof. The memory may be volatile memory or non-volatile memory that stores data and computer executable instructions. The computer executable instructions may be in any form including, but not limited to, machine code, assembly code, and high-level programming code written in any programming language. The module may be configured to use the data to execute one or more instructions to perform one or more tasks.

Also, as referenced herein, the term "communicatively coupled" means capable of sending and/or receiving data over a communication link. In certain embodiments, communication links may also encompass internal communication between various components of a system and/or with an external input/output device such as a keyboard or display device. Additionally, the communication link may include both wired and wireless links, and may be a direct link or may comprise of multiple links passing through one or more communication network devices such as, but not limited to, routers, firewalls, servers, and switches. The network device may be located on various types of networks. A network as used herein means a system of electronic devices that are joined together via communication links to enable the exchanging of information and/or the sharing of resources. Non-limiting examples of networks include local-area networks (LANs), wide-area networks (WANs), and metropolitan-area networks (MANs). The networks may include one or more private networks and/or public networks such as the Internet. The networks may employ any type of communication standards and/or protocol.

Unless specifically indicated, any reference to the processing, retrieving, and storage of data and computer executable instructions may be performed locally on an electronic device and/or may be performed on a remote network device. For example, data may be retrieved or stored on a data storage component of a local device and/or may be retrieved or stored on a remote database or other data storage systems. As referenced herein, the term database or knowledge base is defined as a collection of structured or unstructured data. Although referred to in the singular form, the database may include one or more databases, and may be locally stored on a system or may be operatively coupled to a system via a local or remote network. Additionally, the processing of certain data or instructions may be performed over the network by one or more systems or servers, and the result of the processing of the data or instructions may be transmitted to a local device.

Figure 1:
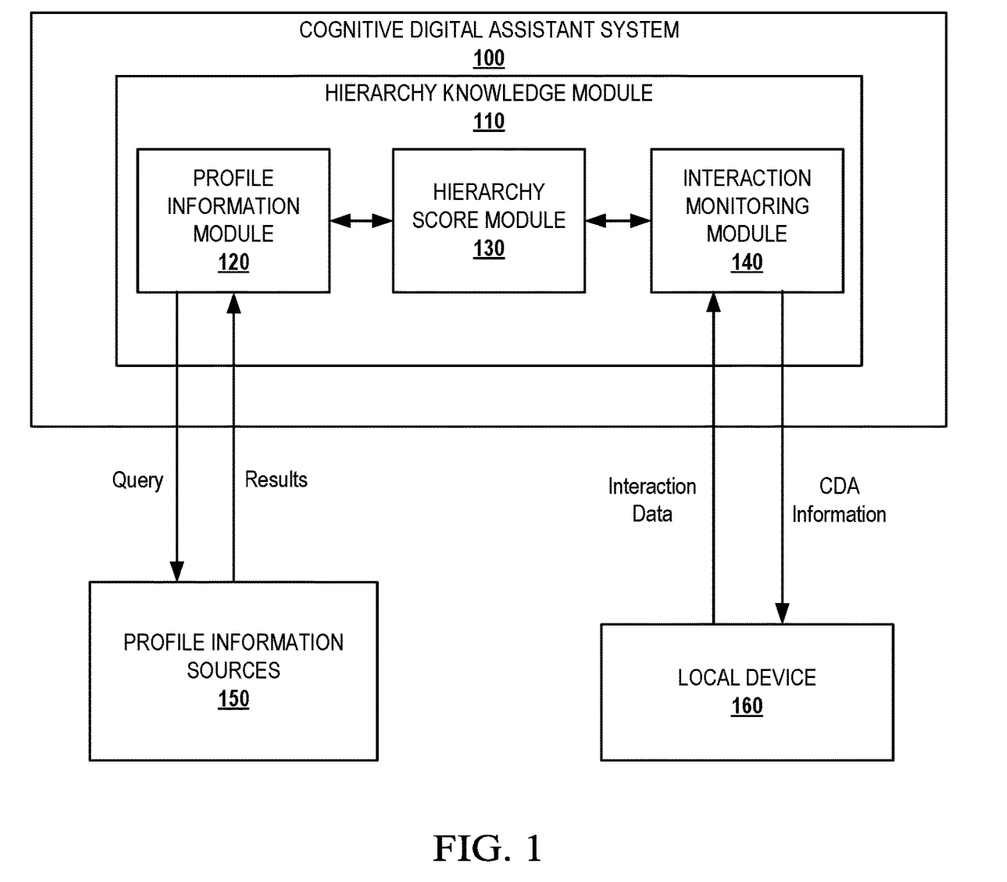
FIG. 1 is a schematic diagram illustrating a cognitive digital assistant system that for incorporates hierarchy knowledge according to an embodiment of the present disclosure.

With reference now to FIG. 1, a cognitive digital assistant system 100 that incorporates hierarchy knowledge according to an embodiment of the present disclosure is presented. In the depicted embodiment, the cognitive digital assistant system 100 includes a hierarchy knowledge module 110. In certain embodiments, the cognitive digital assistant system 100 is a remote network system that is communicatively coupled to a local device 160 and profile information sources 150. As will be further described, the cognitive digital assistant system 100 receives data such as interaction data between one or more participants from the field 160. The cognitive digital assistant system 100 provides data, instructions, or other types of information to the local device 160.

The local device 160 may be any type of electronic device and may vary in size. In certain embodiments, the local device 160 may be carried or worn by an end user. For example, in some embodiments, the local device 160 may be a smart phone, a smart watch, electronic eyewear, or other user electronic devices. In other embodiments, local device 160 may be an electronic device that sits on a desk, installed on a wall or ceiling surface, a wall outlet device, and/or may be integrated into a household item such as an appliance, the frame of a mirror or painting, or a television. In certain embodiments, the local device 160 includes memory, a processor, a microphone, an audio output component such as a speaker, and a network interface for communicating with the cognitive digital assistant system 100 over a network. In certain embodiments, the local device 160 may also include a display or display interface for displaying information to a user. The local device 160 may also include one or more input interfaces for receiving information from a user. In certain embodiments, the local device 160 may respond to verbal instructions or commands from a user.

In the depicted embodiment, the hierarchy knowledge module 110 includes a profile information module 120, a hierarchy score module 130, and an interaction monitoring module 140. The profile information module 120 is configured to retrieve profile information on one or more participants of an interaction from profile information sources 150 and build a user profile for each of the participants. The user profile may include any type of information associated with a particular user. In certain embodiments, the user profile for a participant may be based on a previously generated user profile of the participant if available. The previously generated user profile of a participant may be modified based on any new data such as new interaction data associated with a particular participant since the user profile was last generated. The prior user profile may include information such as, but not limited to, a person's age, income, job title, date of hire, information regarding how the user interacts with others, voice samples, or images.

The profile information sources 150 may include locally stored data and one or more communicatively coupled databases. The locally stored data or communicatively coupled database may include a previously established user profile of a participant or other interaction data associated with a particular participant. Additionally, in certain embodiments, the profile information sources 150 may include publicly or privately available resources. For example, in some embodiments, the profile information sources 150 includes publicly available sources such as online information about a participant including public websites, social media accounts, published documents, and publicly available government information such as county property tax records. In some embodiments, the profile information sources 150 may include private sources such as an internal company employee information or organization chart. The company employee information may include salary information, date of hire, job responsibilities, related team members, and other company information related a particular participant of an interaction. The profile information sources 150 may also include access to a participant's electronic calendar or other appointment tracking software that may provide information such as the identities of other participants of an interaction, topic of discussion, and how often certain participants interact with one another.

The hierarchy score module 130 is configured to receive the user profile information from the profile information module 120 and interaction information from the interaction monitoring module 140. The hierarchy score module 130 is configured to generate or update a hierarchy score for each of the participants based on various factors using the user profile information of each of the participants and the interaction information it obtains from the interaction monitoring module 140. In accordance with various embodiments, non-limiting examples of factors that may affect the hierarchy score of a participant may include power distance, maturity and sophistication, familiarity/intimacy, frequency of contact, talker dominance/submission and time between utterances, talker confidence and assertiveness, personality insights and archetype, tone, and topic and emotion of conversation. Power distance is a measure of how much power or authority a person has in comparison with others. For example, there is a high power distance between a managing partner at a law firm and a fifth-year associate at the law firm, and an even higher power distance between the managing partner and a first year associate at the firm. Maturity and sophistication is a measure of how sophisticated or mature a participant is. In certain embodiments, this factor may take into account a person's age, education, financial history, or other facts that contribute to a person's maturity and sophistication. Familiarity/intimacy measures the relationships between participants. For example, despite having a high power distance between the managing partner at the law firm and the fifth-year associate law firm, if the partner and the fifth-year associate work together on a daily basis and often socialize together outside of the workplace, the familiarity/intimacy between the managing partner and the fifth-year associate may negate some or all of the high power distance as the two of them may have developed a familiar and casual manner of interacting with each other. Similarly, the frequency of contact may negate some of the power distance between two participants even if there is no level of intimacy. Talker dominance/submission and time between utterances is a factor to indicate who is likely in charge or leading an interaction, which may be a sign that the person has higher authority over the others. For example, if a participant regularly leads the interactions between various individuals, that attribute may contribute to a higher hierarchy score for that participant. In addition to talker dominance and time, in certain embodiments, the talker's tone, confidence, assertiveness, or other emotional states may be measured during an interaction and contribute to a person's hierarchy score. For example, in various embodiments, awkward silences, elevation of anger, animosity, and laughter may contribute to a person's hierarchy score. The topic of discussion may also contribute to the hierarchy score of an individual. For example, if a particular individual is giving out orders or instructions to others, or performing a job performance review, the topic identifies that the particular individual should have a higher hierarchy score than the other participants during the interaction. Additionally, personality insights may contribute to a person's hierarchy score. For example, in certain embodiments, various personality traits may be mapped to standardized models to identify a person's likely hierarchy based on the personality traits.

The interaction monitoring module 140 is configured to process the interaction data during an interaction to identify the individuals during an interaction and determine the above factors for the participants. In various embodiments, not all participants of the interaction need to be identified. In other words, the disclosed embodiments may still function as described herein based on an identification of only a few of the participants during an interaction. Interaction data is any information that the system is able to process to identify various aspects of the interaction between the participants including the identities of the participants and one or more of the above factors. For example, interaction data may include audio and still or live video data. Interaction data may also include other data associated with the interaction such as electronic calendar data, environmental sensor data, and presentation data. In one embodiment, the interaction monitoring module 140 may be configured to identify a participant using speech recognition or image recognition. For example, in one embodiment, the interaction monitoring module 140 may be configured to analyze speech and compare the speech to stored voice samples of each of the participants for identifying the speaker during the interaction. Similarly, the interaction monitoring module 140 may also be configured to analyze an image of a speaker against stored images of each of the participants for identifying the speaker during the interaction. In one embodiment, the interaction monitoring module 140 outputs the measurements or values for one or more of the above factors for the participants to the hierarchy score module 130. In various embodiments, the hierarchy score module 130 may be configured to update the hierarchy score for each of the participants during an interaction between the participants based on the interaction information that is gathered during the interaction by the interaction monitoring module 140. For example, if during the interaction, one of the participants is elected as a team lead; the hierarchy score for that participant and possibly others may be updated accordingly.

In various embodiments, the interaction monitoring module 140 may also be configured to provide assistance or other information to one or more participants during the interaction in a manner consistent with the hierarchy score for each of the participants. For example, in certain embodiments, the interaction monitoring module 140 may address, speak, or display an output, to a particular participant during the interaction in a manner consistent with the participant's hierarchy score. For instance, in some embodiments, the interaction monitoring module 140 may make an announcement or presentation to the group of participants when the key speaker starts to walk up a stage to speak or when the key speaker is trying to get the attention of the group. For example, the interaction monitoring module 140 may state "Ladies and gentlemen, please give a warm welcome to our key speaker of the night, the CEO of X company, Mr. Jones" as Mr. Jones is walking up the stage.

In various embodiments, the interaction monitoring module 140 may also be configured to determine or retrieve one or more boundary conditions based on the hierarchy scores of the participants of the interaction. Non-limiting examples of boundary conditions may include specific topics, tone, physical parameters (e.g., touching and distance), and alcohol consumption. In one embodiment, the boundary condition may be determined based on a difference between a hierarchy score of a first participant and a hierarchy score second participant. For example, if the first participant is a new hire and have a hierarchy score of 1, and the second participant is a managing partner at the company and has a hierarchy score of 9, the boundary condition between the first participant and the second participant would be small to indicate that the first participant needs to interact with the second participant in a polite, cordial, and businesslike manner. In contrast, if both the first participant and the second participant have the same hierarchy score (e.g., 5), the boundary condition between the first participant and the second participant would be broad to indicate that the first participant and the second participant are equal in hierarchy and that it may be normal for them to interact in a more informal manner to each other. In other embodiments, the boundary condition may be solely based on the profile information of the participant irrelevant of the hierarchy scores of other participants. For example, in one embodiment, a person with the hierarchy score of 1 (e.g., a new hire) should always behave in a particular manner irrelevant of the hierarchy scores of other participants during an interaction involving coworkers.

The interaction monitoring module 140 may be configured to monitor the interaction of the participants to determine if the boundary condition is exceeded or is close to being exceeded by one or more participants. For instance, the interaction monitoring module 140 may notify a particular participant (e.g., via email, text message, or other forms of notification) if he/she is approaching or exceeding a particular boundary condition. As an example, a new hire may be notified if his behavior, topic of discussion, or alcohol consumption is not appropriate in view of the hierarchy scores of other participants in the room. In certain embodiments, the interaction monitoring module 140 may be configured to determine the alcohol consumption based on visual data by tracking the number of drinks a participant has consumed and/or by communicating with body sensors capable of determining blood alcohol content.

In certain embodiments, the interaction monitoring module 140 may be configured to assist a particular participant during an interaction. For example, the interaction monitoring module 140 may remind a participant of the name, job title, or other facts related to other participants in the room. For example, in one embodiment, the interaction monitoring module 140 may be configured to send or display to the local device 160, which may be a pair of smart glasses, the name and job title of a participant that the wearer of the smart glasses may be looking at. In various embodiments, the interaction monitoring module 140 may be configured to monitor a conversation and assist a participant if the interaction monitoring module 140 determines that the participant is failing to recall a particular fact that can be found online or within some other resource that is communicatively retrievable by the profile information sources 150. For example, if a participant starts discussing a particular sporting event that occurred last night, but does not recall the score, the profile information sources 150 may retrieve and display the score or other facts regarding the event to the user. In other embodiments, the interaction monitoring module 140 may be configured to assist each participant during the interaction in a similar manner.

Although FIG. 1 illustrates the cognitive digital assistant system 100 and the local device 160 as separate devices, in various embodiments, the cognitive digital assistant system 100 may be in integrated within the local device 160. For example, in one embodiment, the cognitive digital assistant system 100 is integrated within the local device 160, and the local device 160 may be a system that is integrated into a wall or ceiling of a room that provides monitoring and assistance to all participants during an interaction occurring within the room. In other embodiments, the local device 160 may be a personal device having the cognitive digital assistant system 100 integrated within. The personal device may be worn or carried by a participant during the interaction to assist the participant during the interaction.

Figure 2:
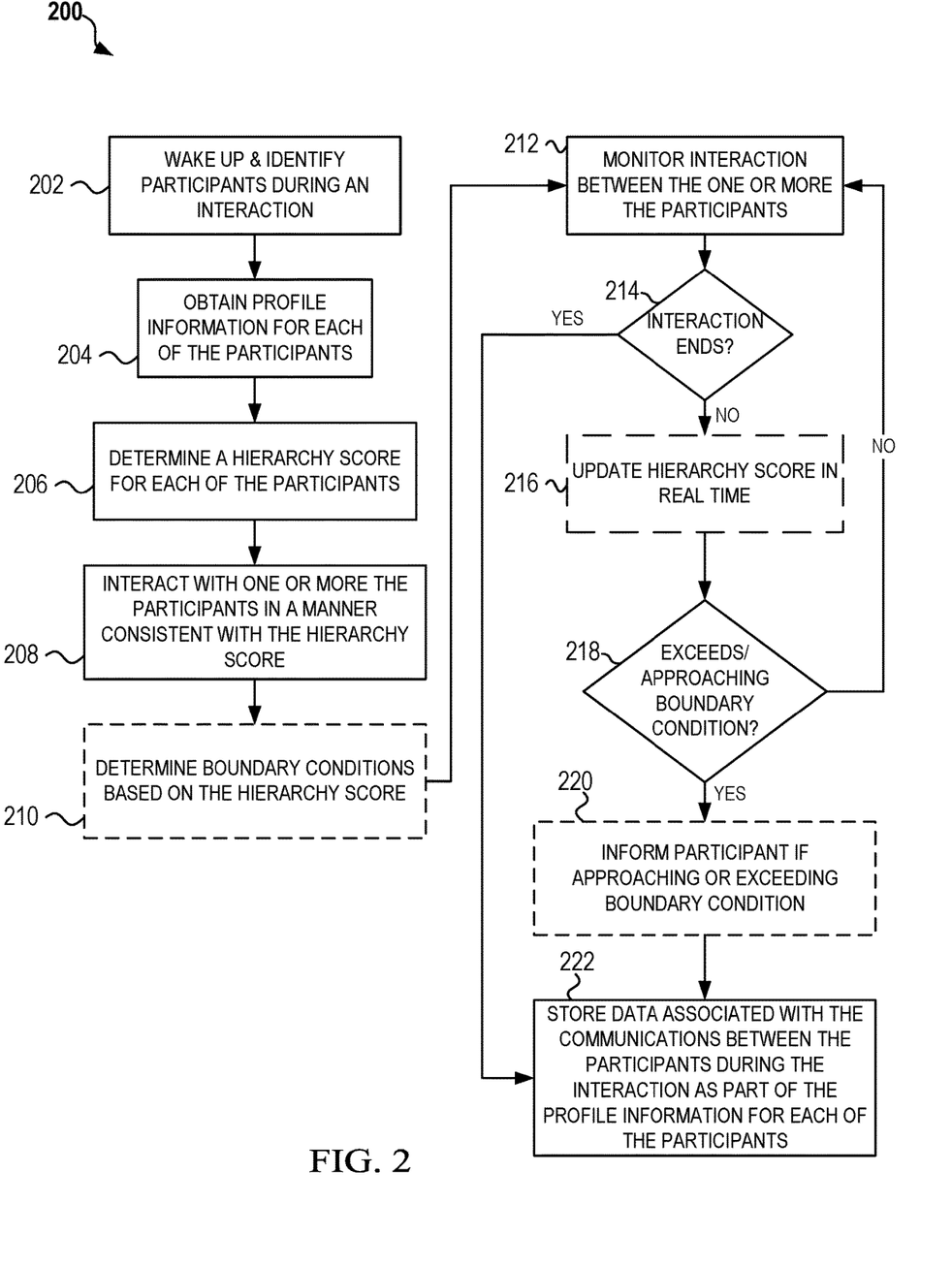
FIG. 2 is a flowchart of a computer-implemented method for incorporating hierarchy knowledge in a cognitive digital assistant system according to an embodiment of the present disclosure.

FIG. 2 is a flowchart of a computer-implemented method 200 for incorporating hierarchy knowledge in a cognitive digital assistant system according to an embodiment of the present disclosure. The computer-implemented method 200 may be implemented by a cognitive digital assistant system according such as the cognitive digital assistant system 100 by executing instructions stored in memory or data storage component of the cognitive digital assistant system 100 using a processor or processing component of the cognitive digital assistant system 100.

The computer-implemented method 200 begins at step 202 with the cognitive digital assistant system waking up and identifying participants during an interaction. In various embodiments, the system may wake up either through a wake word, or on power up, or on detection of conditions where multiple parties are receptive to the participation of a cognitive assistant. For example, in one embodiment, the system may be in stand-by mode and listen for key phrases or words that would alert the system that its assistance is being requested. In other embodiments, the system may always be on or awake at all times. In various embodiments, the system may perform a count and identify the participants within audio or video range of the system, or some other predefined area. For example, in various embodiments, the system may be configured to perform a count and identify the participants within a physical proximity, and/or on a conference call, or a shared virtual space in augmented reality.

In various embodiments, the system is configured to identify and ascribe speech to each of the participants. In various embodiments, the system is configured to convert the speech to text. The system may also be trained and configured to analyze the tone and emotion of the participant's speech. For example, in certain embodiments, the system may be trained using speech models and configured to analyze a participant's speech to determine deference, politeness, anger, and assertiveness. In various embodiments, the system may also be trained and configured to analyze a participant's body language.

In some embodiments, the system may be configured to identify a primary user. For example, in embodiments where the system is serving, or acting on behalf of the person, or speaking only to the person, the system is configured such that its focus and priorities is geared towards assisting this primary person. In other embodiments, the system may be configured to focus its attention on participants that need the most assistance such as a new hire or a participant that is leading the interaction.

Once the participants are identified, the computer-implemented method 200 at step 204 obtains profile information for each of the participants. In various embodiments, the system may obtain information from a multitude of sources that include internal company human resource records (for employees), publicly available social media accounts (e.g., Facebook®, LinkedIn®, Twitter®, Instagram®, Snapchat®, and other social media), public Internet articles about or by the person, an electronic calendar application, previously stored profile information associated with a participant, and publicly available government information. In various embodiments, the system builds or updates a user profile for each of the participants from the obtained information. In various embodiments, the system may be configured to update the profile information as the interaction/meeting unfolds based on a participant's conversation and/or actions during the interaction with other participants.

Based on the user profile information for each of the participants, the computer-implemented method 200 at step 206 determines a hierarchy score for each of the participants. As described above, the hierarchy score may be based on a number of factors including but not limited to a power distance between each of the participants. For example, the power distance between the most senior person in the company among the plurality of participants and the least senior person in the company among the plurality of participants may be used as the maximum power distance between the plurality of participants. The power distance between the other various participants may be determined based on the maximum power distance. Other factors that may affect the hierarchy score as described above include familiarity, personal relationships, maturity and sophistication, frequency of contact, talker confidence, and tone, topic, and emotion of the conversation. For example, a new hire may have a high hierarchy score if the new hire has a personal relationship with another person that has a high hierarchy score. For example, if a new hire is best friends or related to the head of a company, the new hire may be assigned a higher hierarchy score than a typical new hire.

At step 208, the computer-implemented method 200 interacts with one or more participants in a manner consistent with their hierarchy score. For example, in various embodiments, the computer-implemented method 200 may be configured to address the participants in an order based on their respective hierarchy scores such as during introductions or when granting priority to certain participants based on hierarchy score (e.g. participants with the highest hierarchy scores may line up to eat first). The computer-implemented method 200 may also be configured to take a more deferential, formal, and/or polite tone when addressing a participant with a high hierarchy score. For example, if the computer-implemented method 200 receives a request or command (e.g., adjust room temperature) from multiple participants, the computer-implemented method 200 may be configured to initiate the request or command associated with the participant with the highest hierarchy score. In various embodiments, a person's hierarchy score may account for any disability identified in the user profile information of the person. For example, if a particular person has autism, the computer-implemented method 200 may be configured to interact with that particular person differently than a person does not have autism.

In various embodiments, the computer-implemented method 200 at step 210 may be configured to determine boundary conditions based on the hierarchy score for one or more of the participants. As described above, the boundary conditions may include topics of conversation, tone, language, physical boundary conditions, and other social and communication norms that may not be appropriate between the various participants. In various embodiments, the topic of the conversation boundary condition may be participant specific. For example, based on the profile information of a particular participant, a particular topic of discussion may not be appropriate with that particular participant (e.g., politics), while the same topic of discussion may be appropriate with other participants.

At step 212, the computer-implemented method 200 monitors the interaction between the one or more participants. In various embodiments, the monitoring may be in the form of visual monitoring, audio monitoring, sensor monitoring (e.g., environmental sensors and body sensors), or a combination thereof. If the computer-implemented method 200 determines that the interaction between the one or more participants ends during the monitoring process at step 214, the computer-implemented method 200 proceeds to step 222 as described below. In various embodiments, the computer-implemented method 200 at step 216 may update the hierarchy score of one or more participants in real time based on data gathered while monitoring the interaction between the one or more participants.

At step 218, the computer-implemented method 200 determines if the behavior of one or more participants during the interaction is approaching or has exceeded a boundary condition. In some embodiments, the computer-implemented method 200 at step 220 may be configured to provide a warning or some other indication to one or more participants if the computer-implemented method 200 determines that their behavior is approaching or has exceeded a boundary condition. For example, if the computer-implemented method 200 is implemented in a system that is installed on a personal device of a participant, the computer-implemented method 200 may be configured to display or provide some signal on the personal device to the participant that his/her behavior is approaching or exceeding a boundary condition. If the computer-implemented method 200 is implemented in a system that is installed on a wall or ceiling, the computer-implemented method 200 may be configured to make an announcement or perform other actions to segue the topic of discussion to another topic or alert the participant in some other manner of the inappropriate behavior. For example, the system may make an announcement reminding the participants to limit the number of drinks during the interaction as a subtle reminder to those participants that are approaching or exceeding a drinking boundary condition.

In various embodiments, at step 222, the computer-implemented method 200 may be configured to store data associated with the communications or behavior between the participants during the interaction as part of the profile information for each of the participants. This data may be used in updating a hierarchy score of a participant for future assistance. The data may also be analyzed to determine future boundary conditions. For example, if a particular topic during the interaction caused a lot of emotional distress between the participants, that particular topic may be set as a boundary condition in future interactions between the participants.

Figure 3:
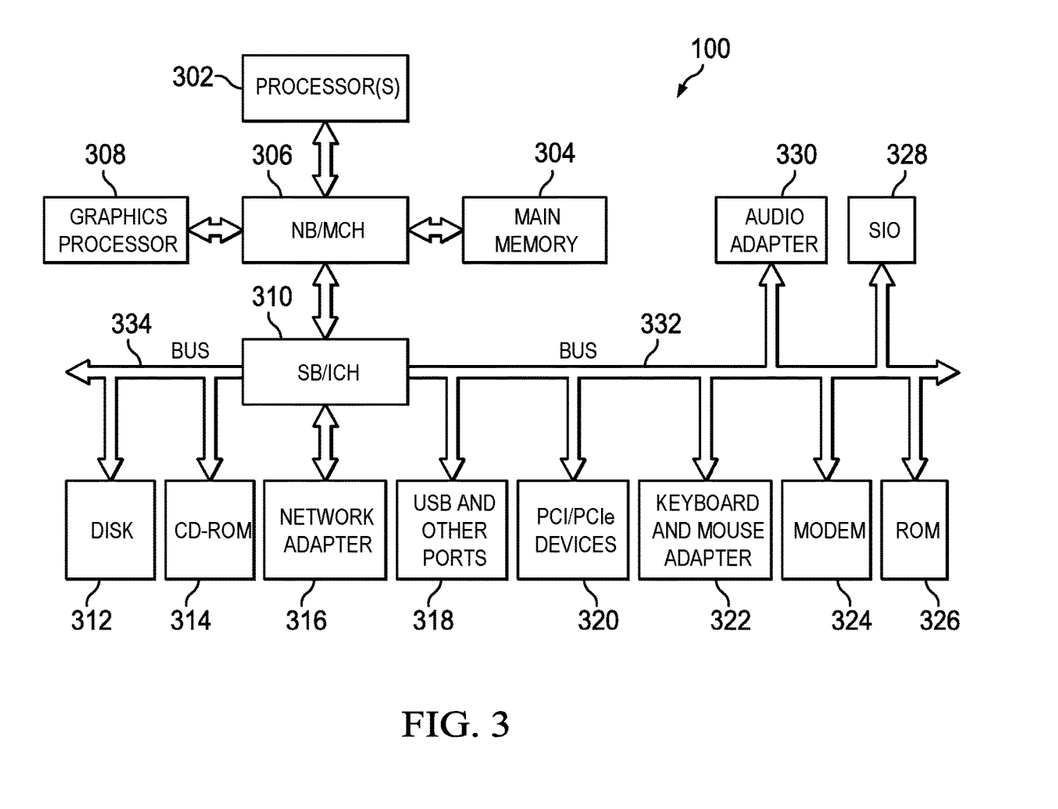
FIG. 3 a schematic diagram illustrating a hardware architecture of a cognitive digital assistant system according to an embodiment of the present disclosure.

FIG. 3 is a block diagram depicting various hardware components of the cognitive digital assistant system 100 according to an embodiment. Although FIG. 3 depicts certain basic components of the cognitive digital assistant system 100, the disclosed embodiments may also be implemented in very advanced systems such as an IBM® Power 750 server or the IBM Watson® supercomputer, which employs a cluster of ninety IBM Power 750 servers, each of which uses a 3.5 GHz POWER7 eight-core processor, with four threads per core. Additionally, certain embodiments of the cognitive digital assistant system 100 may not include all hardware components depicted in FIG. 3. Similarly, certain embodiments of the cognitive digital assistant system 100 may include additional hardware components that are not depicted in FIG. 3.

In the depicted example, the cognitive digital assistant system 100 employs a hub architecture including north bridge and memory controller hub (NB/MCH) 306 and south bridge and input/output (I/O) controller hub (SB/ICH) 310. Processor(s) 302, main memory 304, and graphics processor 308 are connected to NB/MCH 306. Graphics processor 308 may be connected to NB/MCH 306 through an accelerated graphics port (AGP). A computer bus, such as bus 332 or bus 334, may be implemented using any type of communication fabric or architecture that provides for a transfer of data between different components or devices attached to the fabric or architecture.

In the depicted example, LAN adapter 316 connects to SB/ICH 310. Audio adapter 330, keyboard and mouse adapter 322, modem 324, read-only memory (ROM) 326, hard disk drive (HDD) 312, compact disk read-only memory (CD-ROM) drive 314, universal serial bus (USB) ports and other communication ports 318, and peripheral component interconnect/peripheral component interconnect express (PCI/PCIe) devices 320 connect to SB/ICH 310 through bus 332 and bus 334. PCI/PCIe devices may include, for example, Ethernet adapters, add-in cards, and PC cards for notebook computers. PCI uses a card bus controller, while PCIe does not. ROM 326 may be, for example, a flash basic input/output system (BIOS). Modem 324 or network adapter 316 may be used to transmit and receive data over a network.

HDD 312 and CD-ROM drive 314 connect to SB/ICH 310 through bus 334. HDD 312 and CD-ROM drive 314 may use, for example, an integrated drive electronics (IDE) or serial advanced technology attachment (SATA) interface. Super I/O (SIO) device 328 may be connected to SB/ICH 310. In some embodiments, HDD 312 may be replaced by other forms of data storage devices including, but not limited to, solid-state drives (SSDs).

An operating system runs on processor(s) 302. The operating system coordinates and provides control of various components within the cognitive digital assistant system 100 in FIG. 3. Non-limiting examples of operating systems include the Advanced Interactive Executive (AIX®) operating system or the Linux® operating system. Various applications and services may run in conjunction with the operating system. For example, in one embodiment, International Business Machines (IBM)® DeepQA software, which is designed for information retrieval that incorporates natural language processing and machine learning, is executed on cognitive digital assistant system 100.

The cognitive digital assistant system 100 may include a single processor 302 or may include a plurality of processors 302. Additionally, processor(s) 302 may have multiple cores. For example, in one embodiment, cognitive digital assistant system 100 may employ a large number of processors 302 that include hundreds or thousands of processor cores. In some embodiments, the processors 302 may be configured to perform a set of coordinated computations in parallel.

Instructions for the operating system, applications, and other data are located on storage devices, such as one or more HDD 312, and may be loaded into main memory 304 for execution by processor(s) 302. In some embodiments, additional instructions or data may be stored on one or more external devices. The processes for illustrative embodiments of the present invention may be performed by processor(s) 302 using computer usable program code, which may be located in a memory such as, for example, main memory 304, ROM 326, or in one or more peripheral devices 312 and 314.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be apparent from the foregoing that the disclosed embodiments have significant advantages over current art. As an example, the disclosed embodiments improve cognitive digital assistant systems by applying a level of emotional intelligence that they currently do not possess. For example, in one embodiment, a computer-implemented method for incorporating hierarchy knowledge in a cognitive digital assistant system is disclosed herein. The cognitive digital assistant system may be configured to use the hierarchy knowledge to assist a user in navigating a variety of social environments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method executed by a cognitive system for incorporating hierarchy knowledge, the computer-implemented method comprising:
   identifying, using a processor, participants during a live interaction;
   obtaining, using the processor, profile information for each of the participants that are identified in the live interaction;
   determining, using the processor, a hierarchy score for each of the participants based on a comparison of a plurality of factors using the profile information for each of the participants; and
   integrating the hierarchy score for each of the participants into the cognitive system, wherein the cognitive system uses the hierarchy score of the participants to interact with the participants during the live interaction based on the hierarchy scores of the participants.

2. The computer-implemented method of claim 1, further comprising updating the hierarchy score for each of the participants in real time based on communications between the participants during the live interaction.

3. The computer-implemented method of claim 1, further comprising storing data associated with communications between the participants as part of the profile information for each of the participants.

4. The computer-implemented method of claim 1, wherein identifying the participants during the live interaction comprises performing voice recognition on the participants.

5. The computer-implemented method of claim 1, wherein identifying the participants during the live interaction comprises retrieving a calendar appointment that indicates identities of the participants.

6. The computer-implemented method of claim 1, wherein obtaining the profile information for each of the participants comprises consuming publicly available online information.

7. The computer-implemented method of claim 6, wherein the publicly available online information comprises social media information, organization information, and publicly available government information.

8. The computer-implemented method of claim 1, wherein the plurality of factors comprises frequency of contact.

9. The computer-implemented method of claim 1, further comprising:
   determining boundary conditions between the participants based on the hierarchy score for each of the participants, wherein the boundary conditions define behavioral limits for each of the participants during the live interaction, and wherein the boundary conditions include topics of discussion that are not appropriate during the live interaction;
   analyzing interactions between the participants to determine whether the boundary conditions are exceeded; and
   informing a participant when a boundary condition has been exceeded.

10. The computer-implemented method of claim 1, wherein the cognitive system is configured to assist any of the participants during the live interaction.

11. The computer-implemented method of claim 1, wherein the cognitive system is configured to assist a primary participant during the live interaction.

12. The computer-implemented method of claim 11, wherein the cognitive system is configured to receive input regarding the participants during the live interaction from an electronic device worn by the primary participant.

13. The computer-implemented method of claim 1, wherein the cognitive system is configured to receive input regarding the participants during the live interaction from an electronic device installed in a room in which the live interaction takes place.

14. A cognitive system configured to incorporate hierarchy knowledge in assisting a user, the cognitive system comprising a processor configured to execute instructions to:
   identify participants during a live interaction;
   obtain profile information for each of the participants that are identified in the live interaction;
   determine a hierarchy score for each of the participants based on a plurality of factors using the profile information for each of the participants; and
   integrate the hierarchy score for each of the participants into the cognitive system, wherein the cognitive system uses the hierarchy score of the participants to interact with the participants during the live interaction based on the hierarchy scores of the participants.

15. The cognitive system of claim 14, wherein the processor is configured to further execute instructions to update the hierarchy score for each of the participants in real time based on communications between the participants during the live interaction.

16. The cognitive system of claim 14, wherein the processor is configured to further execute instructions to:
   determine boundary conditions between the participants based on the hierarchy score for each of the participants, wherein the boundary conditions define behavioral limits for each of the participants during the live interaction, and wherein the boundary conditions include topics of discussion that are not appropriate during the live interaction;

analyze interactions between the participants to determine whether the boundary conditions are exceeded; and inform a participant when a boundary condition has been exceeded.

17. The cognitive system of claim 14, wherein the plurality of factors comprises a familiarity level between the participants.

18. A computer program product for incorporating hierarchy knowledge in a cognitive system, the computer program product comprising a computer readable storage medium having program instructions embodied therewith, the program instructions executable by a processor of the cognitive system to cause the cognitive system to:

identify participants during a live interaction;

obtain profile information for each of the participants that are identified in the live interaction;

determine a hierarchy score for each of the participants based on a plurality of factors using the profile information for each of the participants; and integrate the hierarchy score for each of the participants into the cognitive system, wherein the cognitive system uses the hierarchy score of the participants to interact with the participants during the live interaction based on the hierarchy scores of the participants.

19. The computer program product of claim 18, wherein the program instructions executable by the processor further includes program instructions for causing the cognitive system to update the hierarchy score for each of the participants in real time based on communications between the participants during the live interaction.

20. The computer program product of claim 18, wherein the program instructions executable by the processor for interacting with the participants in the manner consistent with the hierarchy score comprises program instructions for:

determining boundary conditions between the participants based on the hierarchy score for each of the participants, wherein the boundary conditions define behavioral limits for each of the participants during the live interaction, and wherein the boundary conditions include topics of discussion that are not appropriate during the live interaction;

analyzing interactions between the participants to determine whether the boundary conditions are exceeded; and informing a participant when a boundary condition has been exceeded.

\* \* \* \* \*